United States Patent [19]
Fleuridas et al.

[11] Patent Number: 5,105,578
[45] Date of Patent: Apr. 21, 1992

[54] FERTILIZER APPLICATING TOOL

[76] Inventors: André M. Fleuridas, 5860 E. Dynamite Blvd., Cave Creek, Ariz. 85331; Reuben J. Ulrich, Jr., #7 Spruce Country Club Village, Minot, N. Dak. 58701

[21] Appl. No.: 555,107

[22] Filed: Jul. 20, 1990

[51] Int. Cl.⁵ .............................................. A01G 17/14
[52] U.S. Cl. ...................................................... 47/48.5
[58] Field of Search .................. 47/27, 48.5, 57.5; 175/19, 20, 23

[56] References Cited

U.S. PATENT DOCUMENTS

| | | | |
|---|---|---|---|
| 762,589 | 6/1904 | Lawrence | 47/48.5 |
| 1,052,809 | 2/1913 | Frankignoul | 175/23 |
| 2,857,864 | 10/1958 | Cromer | 47/48.5 |
| 3,916,564 | 11/1975 | Crowell, Sr. | 175/23 |
| 4,191,116 | 3/1980 | Allison, Jr. et al. | 175/19 |
| 4,745,706 | 5/1988 | Muza et al. | 47/47 |

Primary Examiner—Richard E. Chilcot, Jr.
Assistant Examiner—Michele A. Van Patten

[57] ABSTRACT

A hand operated fertilizer application tool which can be used to introduce fertilizer into the soil surrounding the roots of plants and is made up of an insertion assembly which is a long tubular body having at its lower end a conical terminating at a closed point, a stop ring attached to the tubular body above the conical and is used to position a filler tube assembly in the proper location on the tubular body, a funnel support mounted on the tubular body above the stop ring which provides an area to apply foot pressure to aid in driving the tool into the soil and a handle mounted on the upper end of the tubular body is a handle.

3 Claims, 3 Drawing Sheets

FERTILIZER APPLICATING TOOL

BACKGROUND OF THE INVENTION

1. Field of the Invention

This invention relates to a hand operated fertilizing tool and in particular, to a device for displacing soil and replacing it with a fertilizing substance.

2. Description of the Prior Art

It is common practice to supplement soil with plant food or fertilizer to stimulate the growth of plants. In the past different methods for completing this task have either been inefficient or excessively complicated.

Without the use of a tool, the fertilizer can be distributed on the surface of the soil around the base of the plant. This is inefficient because the fertilizer can easily be washed away by rain or blown away by the wind. This method also exposes a possibly hazardous substance to children and pets. This method can also damage lawns by chemically burning the roots.

Another method of fertilizing is to use a tool to apply the fertilizer into the soil. Several examples of these tools are described below.

U.S. Pat. No. 2,931,140 to Laffler illustrates a fertilizing cartridge which is filled with fertilizer and then driven into the soil and left to decompose in the soil. The problem with this tool is the tool can only be used once. This can lead to higher costs if a large number of plants are to be fed regularly. Another possible problem is the decomposing cartridge may be harmful to the ecology.

U.S. Pat. No. 3,345,774 to Delbuguet describes another fertilizing device which is designed to be filled with fertilizer and driven into the soil at the base of a plant. The device remains in the soil and releases the fertilizer at an adjustable rate. The disadvantage to this tool is that it can only be used to feed one plant over a limited area and more than one tool is required to feed a number of plants simultaneously.

One advantage with the present invention is that it can be used to feed a greater number of plants over a shorter period of time.

Several tools have been patented which are designed to remove a plug of soil form the ground. The hole left in the ground can then be filled with fertilizer or left open to aerate the plant's roots. Two of these are cited in U.S. Pat. No. 3,210,112 to GLynn and U.S. Pat. No. 4,819,735 to Pucket. One of the disadvantages of this type of tool is that a device must be incorporated in the tool to eject the plug of soil from the tool. This ejection device is susceptible to jamming and to corrosion form dirt and moisture contamination. The increased number of parts required also leads to a higher tool cost to the consumer.

The present invention is comprised of two main assemblies and has no ejection assembly. It is not easily susceptible to damage from dirt and moisture contamination. The cited inventions do not fulfill the intended purposes of the present invention. The object of the present invention is to provide a tool which can be used to introduce various types of fertilizer into the soil surrounding plants. Another object of the present invention is to provide a tool which does not remain in the soil, thus allowing it to be used on a greater number of plants. Another object is to provide a tool that contains a fewer number of parts to minimize costs. Still another object is to provide a tool that will operate in a greater variety of soil types, such as rocky, sandy, clayey or gravely.

SUMMARY OF THE INVENTION

The present invention is a hand operated fertilizer applicating tool which can be used to introduce fertilizer into the soil surrounding the roots of plants. The invention creates a void in the soil and allows for easy fillng of said void with a fertilizing substance.

The invention comprises two assemblies. The insertion assembly and the filler tube assembly.

The insertion assembly comprises a long tubular body. Attached to the lower end of the tubular body is a conical terminating at a closed point. The taper of the conical is such that to allow for easy insertion into the soil. A stop ring is attached to the tubular body above the conical. The stop ring is used to position the filler tube in the proper location on the tubular body. A funnel support is attached to the tubular body above the stop ring. The lower side of the funnel support provides further support to the filler tube for correct positioning while inserting the tool into the soil. The upper side of the funnel support provides the user with an area to apply foot pressure to aid in driving the tool into the soil. Mounted at the upper end of the tubular body is a handle. The handle provides the user with the means to apply hand pressure to drive the tool into the soil. The handle also provides the user with the means to withdraw the insertion assembly from the soil after use.

The second assembly is the filler tube assembly. The filler tuber assembly comprises a funnel mounted at the upper end of a hollow tubular member. The funnel provides the user with easy means for filling the hollow tubular member with fertilizer. The lower end of the hollow tubular member is tapered inwardly toward the central axis of the filler tube assembly to form a seal. The taper of the seal is formed to match the taper of the conical on the insertion assembly. When the filler tube is installed on the isertion assembly the seal prevents contaminating substances from jamming the two assemblies together.

DESCRIPTION OF A PREFERRED EMBODIMENT

Figure 1:
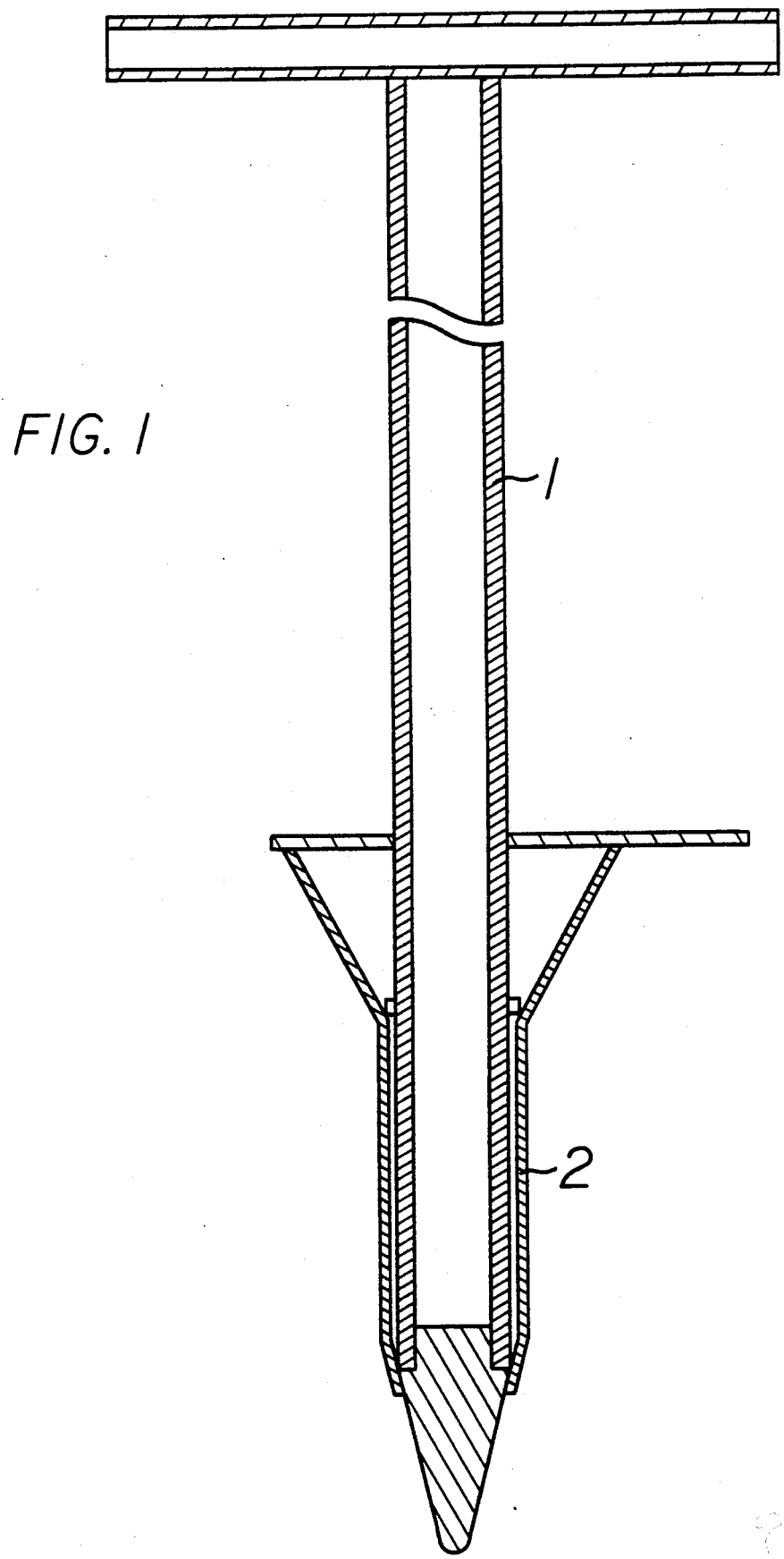
FIG. 1 is a frontal, cross-sectional view of the filler tube assembly installed on the insertion assembly.
Figure 2:
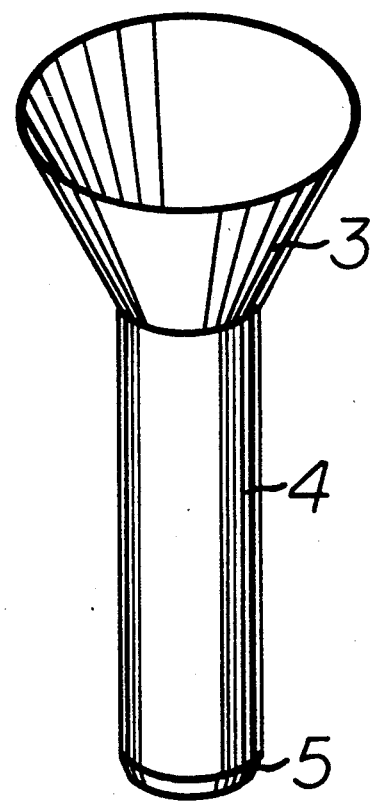
FIG. 2 is an elevated perspective view of the filler tube assembly.
Figure 3:
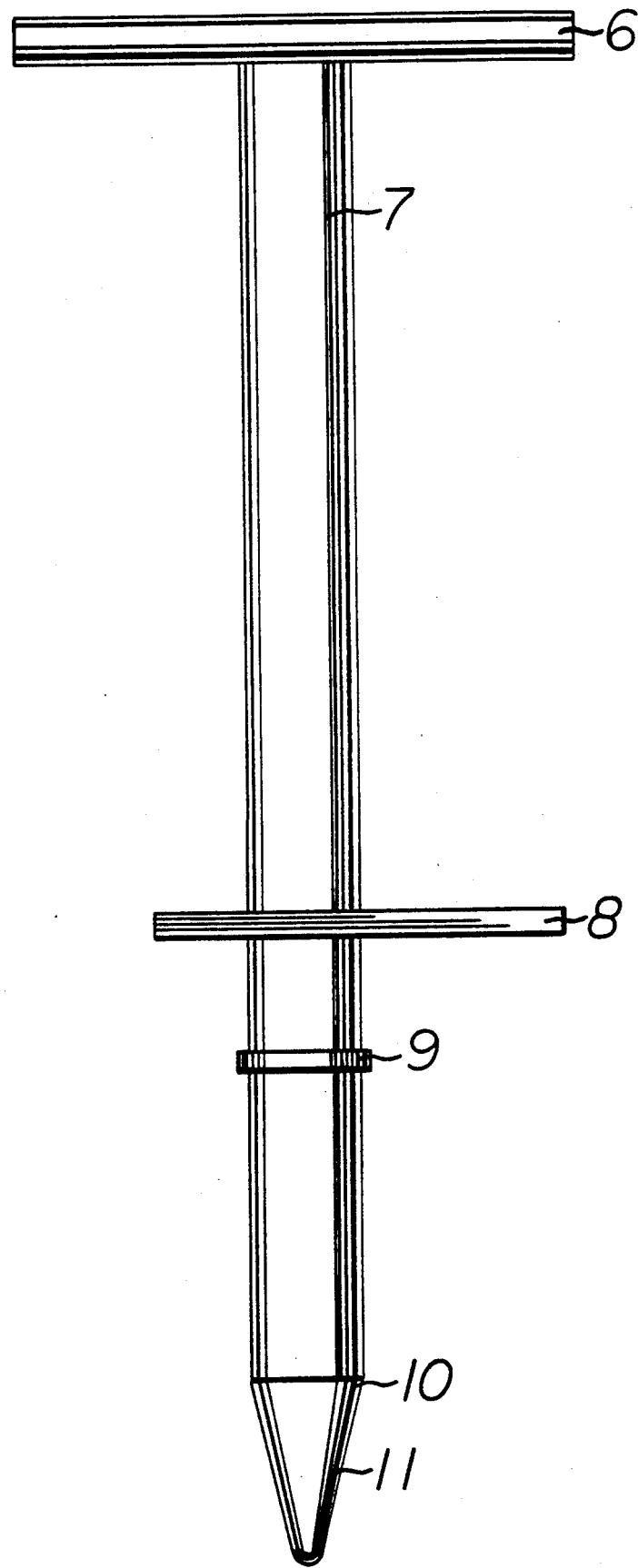
FIG. 3 is a frontal view of the insertion assembly.

Referring more specifically to the drawings, the invention consists of an insertion assembly 1, comprising a tubular handle 6, fixably attached to the upper end of the tubular body 7. A conical 11, tapering to a closed point, is fixably attached to the lower end of the tubular body 7. A stop ring 9, is fixably attached to the tubular body 7, in such a position that when the filler tube assembly 2, is positioned over the insertion assembly 1, the stop ring 9, will contact the smallest internal diameter of the funnel 3, at the same instant the tapered seal 5, will contact the sealing surface 10, of the conical 11. A funnel support 8, is fixably attached to the tubular body 7, in such a position that when the smallest internal diameter of the funnel 3, is contacting the step ring 9, the largest end of the funnel 3, will rest on the lower side of the funnel support 8.

The filler tube assembly 2, comprises a hollow tubular member 4, fixably attached to the smaller end of a funnel 3. The smaller external and internal diameters of the funnel 3, are equal in size to the external and internal diameters of the hollow tubular member 4. A seal 5, tapes inwardly toward the central lineal axis of the filler tube assembly 2. The angle of the seal 5, is such that to provide the greatest sealing ability with the sealing surface 10, on the conical 11.

The internal diameter of the filler tube assembly 2, is sized to provide a slight clearance gap between the internal surface of the hollow tubular member 4, and the external diameter of the tubular body 7, between the stop ring 9, and the sealing surface 10. This clearance gap will allow the filler tube assembly 2, to easily slide over the insertion assembly 1, without binding.

In a preferred embodiment, the filler tube assembly 2, is molded in one piece from a suitable material such as a rigid type of plastic. Polypropylene has been found to be a suitable material for the filler tube assembly 2. The insertion assembly 1, is manufactured from a material with sufficient rigidity and strength so as to maintain proper form through repeated use. Steel can be used or a rigid, high strength plastic, or any combination of materials with similar properties. The insertion assembly 1, may be made in one piece design, as molded in plastic, or may be made from multiple parts fixably attached together with adhesives, or by other fastening methods.

In order to use the device, the user positions the filler tube assembly 2, over the conical 11, and slides the funnel 3, to meet with the funnel support 8. The user then positions the point of the conical 11, on the area to be fertilized. Downward pressure is applied to the handle 6, and to the upper side of the funnel support 8. The applied pressure drives the filler tube assembly 2, into the soil stopping at the smaller diametrical edge of the funnel 3. Then an upward force is applied to the handle 6, removing the insertion assembly 1, from the soil. The friction between the soil and the outer wall of the filler tube assembly 2, serves to retain the filler tube assembly 2, in the soil while the insertion assembly 1, is being withdrawn. The resistance between the seal 5, and the soil, while the device is being inserted into the soil, causes the seal 5, to exert pressure against the sealing surface 10, of the conical. This effectively seals the clearance gap, between the internal surface of the filler tube assembly 2, and the external surface of the tubular body 7, from contaminating materials.

Once the insertion assembly 1, has been withdrawn from the soil, the fertilizing substance is poured into the funnel 3, filling the filler tube assembly 2. Then the user grasps the funnel 3, and pulls upwardly to remove the filler tube assembly 2, from the soil. As the filler tube assembly 2, is moving upwardly, the fertilizing substance passes through the opening at the end of the seal 5. The fertilizing substance remains in the soil after the filler tube assembly 2, has been removed from the soil.

While a preferred embodiment of the invention has been described using specific terms, such description is for illustrative purposes only, and it is to be understood that changes and variations may be made without departing from the spirit or scope of the following claims:

We claim:

1. A hand operated fertilizer applicating tool, for introducing a fertilizing substance into the soil, comprising; an installation assembly, for the purpose of inserting a filler tube assembly into soil, comprising; a tubular body having two opposing ends; a handle mounted at a upper end of said tubular body, for providing a user with means to hold said installation assembly; a conical mounted at a lower end of said tubular body for providing means to reduce force to insert the device into soil; a stop ring mounted on said tubular body, to provide means for positioning a filler tube assembly on said installation assembly; a funnel support, mounted on said tubular body, which means is provided, by engaging with a foot of a user, for applying pressure to the device.

2. A hand operated fertilizing tool, as in claim 1, further comprising a funnel support mounted on said tubular body which means is provided to maintain proper position of a filler tube assembly.

3. A hand operated fertilizer applicating tool, as in claim 1, further comprising a filler tube assembly, for providing means to receive a fertilizing substance after said installation assembly has been withdrawn from said filler tube assembly, comprising a hollow tubular member having two opposing ends with an open funnel at one end, for providing means to fill said hollow tubular member with fertilizer, and further comprising a seal at the end of the hollow tubular member opposite the end with said open funnel, comprising a tapered flange which is forced against a portion of the external surface of said conical, by the resistance of soil being displaced by said installation assembly, for providing means to prevent said filler tube assembly from becoming jammed by contaminating materials while the device is inserted into soil.

* * * * *